United States Patent
Steijner et al.

(10) Patent No.: US 10,786,831 B2
(45) Date of Patent: Sep. 29, 2020

(54) VIBRATOR ASSEMBLIES AND ELECTRONIC DEVICES INCORPORATING SAME

(71) Applicant: Sony Mobile Communications Inc., Tokyo (JP)

(72) Inventors: Magnus Steijner, Loddekopinge (SE); Stjepan Begic, Bunkeflostrand (SE); Olof Simonsson, Malmo (SE); Martin Nystrom, Horja (SE)

(73) Assignee: Sony Mobile Communications Inc., Tokyo (JP)

( * ) Notice: Subject to any disclaimer, the term of this patent is extended or adjusted under 35 U.S.C. 154(b) by 844 days.

(21) Appl. No.: 15/309,959

(22) PCT Filed: Dec. 22, 2015

(86) PCT No.: PCT/JP2015/006412
§ 371 (c)(1),
(2) Date: Nov. 9, 2016

(87) PCT Pub. No.: WO2017/109818
PCT Pub. Date: Jun. 29, 2017

(65) Prior Publication Data
US 2018/0036770 A1    Feb. 8, 2018

(51) Int. Cl.
*H02K 41/06* (2006.01)
*B06B 1/04* (2006.01)
*H02K 1/27* (2006.01)
*H04M 19/04* (2006.01)
*B06B 1/16* (2006.01)
*H02K 7/06* (2006.01)
*H02K 7/08* (2006.01)
*H02K 7/116* (2006.01)
*H04M 1/02* (2006.01)

(52) U.S. Cl.
CPC ............... *B06B 1/04* (2013.01); *B06B 1/167* (2013.01); *H02K 1/27* (2013.01); *H02K 7/063* (2013.01); *H02K 7/08* (2013.01); *H02K 7/116* (2013.01); *H02K 41/06* (2013.01); *H04M 19/047* (2013.01); *H04M 1/026* (2013.01)

(58) Field of Classification Search
CPC .......... H02K 1/27; H02K 7/063; B06B 1/167; B06B 1/04
USPC .......................................... 310/81
See application file for complete search history.

(56) References Cited

U.S. PATENT DOCUMENTS 2,761,079 A    8/1956    Giertz-Hedstrom et al.
4,774,440 A    9/1988    Bhadra
(Continued)

FOREIGN PATENT DOCUMENTS

JP    H0837754    2/1996
JP    2010057229    3/2010

OTHER PUBLICATIONS

International Search Report and Written Opinion for PCT/JP2015/006412 dated Sep. 5, 2016, 11 pages.

*Primary Examiner* — Terrance L Kenerly
(74) *Attorney, Agent, or Firm* — Myers Bigel, P.A.

(57) ABSTRACT

A vibrator assembly includes a housing defining a longitudinal central axis and a rotor in the housing and spaced apart from the central axis. The rotor defines a longitudinal rotational axis that is parallel to the central axis. The rotor is configured to rotate about the rotational axis and, in response, to rotate about the central axis.

18 Claims, 9 Drawing Sheets

(56) References Cited

U.S. PATENT DOCUMENTS

| | | | | |
|---|---|---|---|---|
| 5,345,133 A | * | 9/1994 | Satake | H02K 1/27 310/156.45 |
| 2009/0230796 A1 | * | 9/2009 | Zhao | H02K 7/063 310/81 |
| 2014/0302738 A1 | * | 10/2014 | Srinivasa Prasanna | H02K 49/046 446/15 |

* cited by examiner

VIBRATOR ASSEMBLIES AND ELECTRONIC DEVICES INCORPORATING SAME

CROSS-REFERENCE TO RELATED APPLICATION

This application is a 35 U.S.C. § 371 national stage application of PCT International Application No. PCT/JP2015/006412, filed on 22 Dec. 2015, the disclosure and content of which is incorporated by reference herein in its entirety.

TECHNICAL FIELD

The present disclosure relates to vibrator assemblies and electronic devices incorporating vibrator assemblies.

BACKGROUND ART

Conventional vibrators in electronic devices include a motor with an unbalanced mass. These vibrators are relatively bulky. A vibrator having reduced size would help reduce the size and/or increase the efficiency of electronic devices such as smart phones and smart watches.

SUMMARY

Some embodiments of the present invention are directed to a vibrator assembly. The vibrator assembly includes a housing defining a longitudinal central axis and a rotor in the housing and spaced apart from the central axis. The rotor defines a longitudinal rotational axis that is parallel to the central axis. The rotor is configured to rotate about the rotational axis and, in response, to rotate about the central axis.

According to some embodiments, the vibrator assembly is configured to vibrate in response to the rotation of the rotor about the central axis.

According to some embodiments, the vibrator assembly includes at least one outer electromagnet between the housing and the rotor, with the at least one outer electromagnet configured to generate a magnetic field to rotate the rotor about the rotational axis.

According to some embodiments, the vibrator assembly includes a center electromagnet having a longitudinal axis that is coaxial with the central axis, with the outer electromagnet and the center electromagnet configured to generate an oscillating magnetic field therebetween to rotate the rotor about the rotational axis. The outer and center electromagnets may be configured to receive electric current from at least one power source to sequentially change the magnetic polarity of the outer and center electromagnets to generate the oscillating magnetic field.

According to some embodiments, the at least one outer electromagnet includes first and second electromagnets. The first and second electromagnets may face one another and may be configured to generate an oscillating magnetic field therebetween to rotate the rotor about the rotational axis. The at least one outer electromagnet may include third and fourth electromagnets. The third and fourth electromagnets may face one another and may be configured to generate an oscillating magnetic field therebetween to rotate the rotor about the rotational axis.

According to some embodiments, the vibrator assembly includes a suspension system in the housing, and the rotor is configured to translate along the suspension system to rotate about the central axis. The suspension system may include an outer gear and an inner gear with a gap defined between the outer gear and the inner gear, and the rotor may be configured to translate in the gap to rotate about the central axis. The vibrator assembly may include a rotor gear on the rotor. The outer gear may be fixed relative to the housing, the inner gear may be rotatable relative to the housing, the rotor gear may engage the outer gear and the inner gear, the inner gear may be configured to rotate in response to the rotation of the rotor about the rotational axis, and/or the rotor may be configured to translate in the gap in response to the rotation of the inner gear.

According to some embodiments, the rotor is configured to rotate about the central axis in a circular pattern. According to some embodiments, the rotor is configured to rotate about the central axis in an elliptical pattern.

According to some embodiment, the rotor includes a permanent magnet.

Some other embodiments of the present invention are directed to a vibrator assembly. The vibrator assembly includes at least one electromagnet defining an enclosure, with the enclosure defining a longitudinal central axis at a center of the enclosure. The vibrator assembly includes at least one elongated rotor in the enclosure and spaced apart from the central axis, with the rotor defining a longitudinal rotational axis that extends through the center of mass of the rotor. The at least one electromagnet is configured to generate a magnetic field, the rotor is configured to rotate about the rotational axis in response to the generated magnetic field, and the rotor is configured to rotate about the central axis in response to the rotation of the rotor about the rotational axis.

According to some embodiments, the at least one electromagnet includes an outer electromagnet, and the vibrator assembly further includes a central electromagnet with the rotor in a gap defined between the outer and central electromagnets. The outer electromagnet and the central electromagnet are configured to generate an oscillating magnetic field therebetween to rotate the rotor about the rotational axis.

According to some embodiments, the at least one electromagnet includes first and second electromagnets that face one another. The first and second electromagnets are configured to sequentially turn on and/or change magnetic polarity to generate the magnetic field.

According to some embodiments, the at least one electromagnet includes first, second, third and fourth electromagnets, with the first and third electromagnets facing one another and the second and fourth electromagnets facing one another. The first, second, third and fourth electromagnets are configured to sequentially turn on and/or change magnetic polarity to generate the magnetic field.

According to some embodiments, the vibrator assembly includes a suspension system holding the rotor. The rotor is configured to translate along the suspension system to rotate about the central axis.

Some other embodiments of the present invention are directed to an electronic device. The electronic device includes a housing and a vibrator assembly in the housing. The vibrator assembly includes a housing defining a longitudinal central axis and a rotor in the housing and spaced apart from the central axis. The rotor defines a longitudinal rotational axis that is parallel to the central axis. The rotor is configured to rotate about the rotational axis and, in response, to rotate about the central axis. The vibrator assembly is configured to vibrate the electronic device housing in response to the rotation of the rotor about the central axis.

According to some embodiments, the electronic device is a mobile telephone. According to some embodiments, the electronic device is a smart watch. According to some embodiments, the electronic device is a smart bracelet.

Further features, advantages and details of the present invention will be appreciated by those of ordinary skill in the art from a reading of the figures and the detailed description of the preferred embodiments that follow, such description being merely illustrative of the present invention.

DESCRIPTION OF EMBODIMENTS

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "includes," "comprising," and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Various embodiments of the present invention are directed to a vibrator assembly including a housing (which may be or include one or more electromagnets) and a rotor held in the housing. The housing defines a central longitudinal axis and the rotor has a center of mass that rotates about the housing central axis. The vibrator assembly vibrates due to this rotation of the rotor about the housing central axis. The rotor also rotates about its own rotational longitudinal axis. In this regard, the frequency of the vibration is independent of the rotational speed or frequency of the rotor about its own rotational axis. As will be described in more detail below, this arrangement allows for the rotor to rotate at considerably higher speeds, which increases the efficiency of the rotor and reduces the necessary size of the vibrator assembly. Vibrator assemblies according to embodiments described herein may be used in electronic devices such as mobile terminals (e.g., cellular telephones, tablet computers, etc.) and wearable electronic accessories or devices (e.g., smart watches, smart bracelets, etc.).

Figure 1:
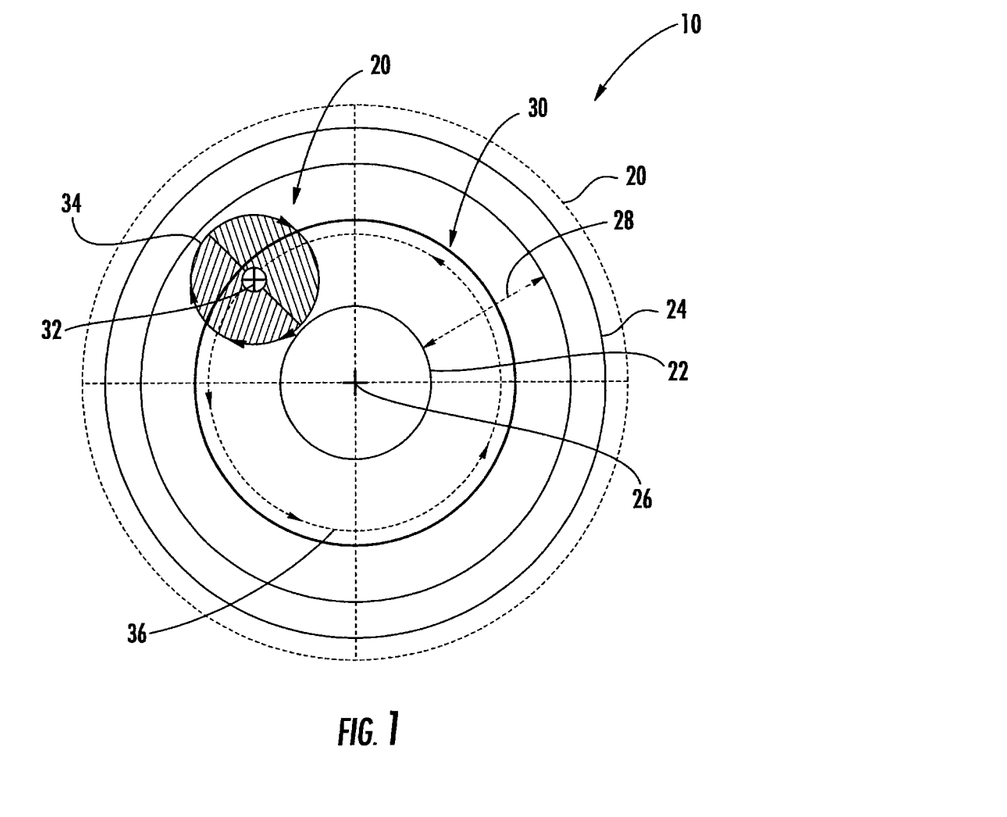
FIG. 1 is an axial or end view of a vibrator assembly according to some embodiments.

A vibrator assembly 10 according to some embodiments is illustrated in FIG. 1. The vibrator assembly 10 optionally includes a casing, housing or enclosure 12.

A rotor 20 is between a center or central electromagnet 22 and an outer electromagnet 24. According to some embodiments, the rotor 20 is or includes a permanent magnet. The center electromagnet 22 and the outer electromagnet 24 may also be referred to herein as the center pole piece and the outer pole piece, respectively.

According to some embodiments, the outer electromagnet 24 is coupled to the housing 12. According to some other embodiments, the housing 12 may be omitted and the outer electromagnet 24 may serve as the outer casing, housing or enclosure for the vibration assembly 10. According to some embodiments, the center electromagnet 22 is coupled to an end portion of the housing 12 and/or an end portion of the outer electromagnet 24.

The housing 12 (where used), the center electromagnet 22 and the outer electromagnet 24 each define a central longitudinal axis 26. The rotor 20 is held between the center and outer electromagnets 22, 24 by one or more suspension members or systems 30.

As described in more detail below, an electric current is supplied to the center and outer electromagnets 22, 24 (or a coil associated therewith) to produce an oscillating radial magnetic field 28. The oscillating magnetic field 28 causes the rotor 20 to rotate about its longitudinal rotational axis 32, which extends through the center of mass of the rotor 20. This rotation of the rotor 20 is indicated by the arrow 34 in FIG. 1.

The rotor 20 also translates along the suspension member or system 30. In this regard, the rotor 20 rotates around the central axis 26 of the housing 12, the center electromagnet 22 or the outer electromagnet 24. In other words, the rotor 20 rotates around the center electromagnet 22. This rotation of the rotor 20 is indicated by the arrow 36 in FIG. 1. According to some embodiments, the rotor 20 rotates about the central axis 26 in response to the rotation of the rotor 20 about its longitudinal axis 32. The rotation of the rotor 20 about the central axis 26 causes the vibrator assembly 10 (and any electronic device in which the vibrator assembly 10 is installed) to vibrate.

Electric current may be supplied to the center and outer electromagnets 22, 24 by an electrical or coil assembly 40.

Figure 2:
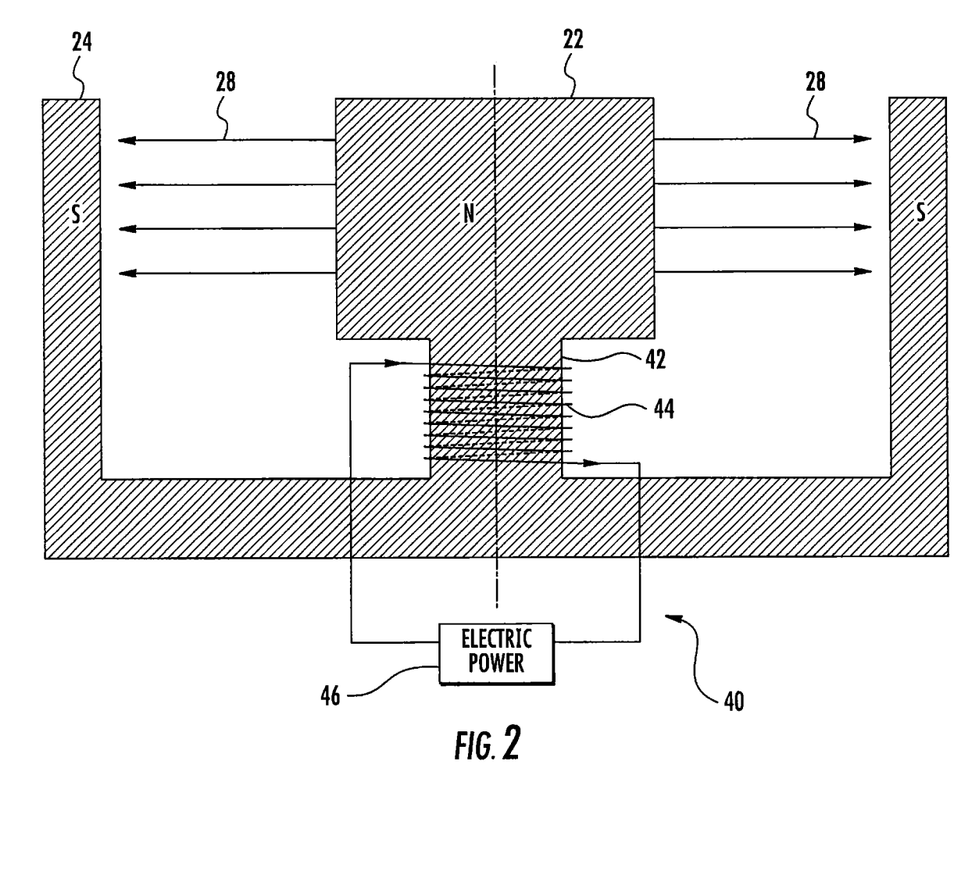
FIG. 2 is a sectional view of the vibrator assembly of FIG. 1 according to some embodiments.
Figure 3:
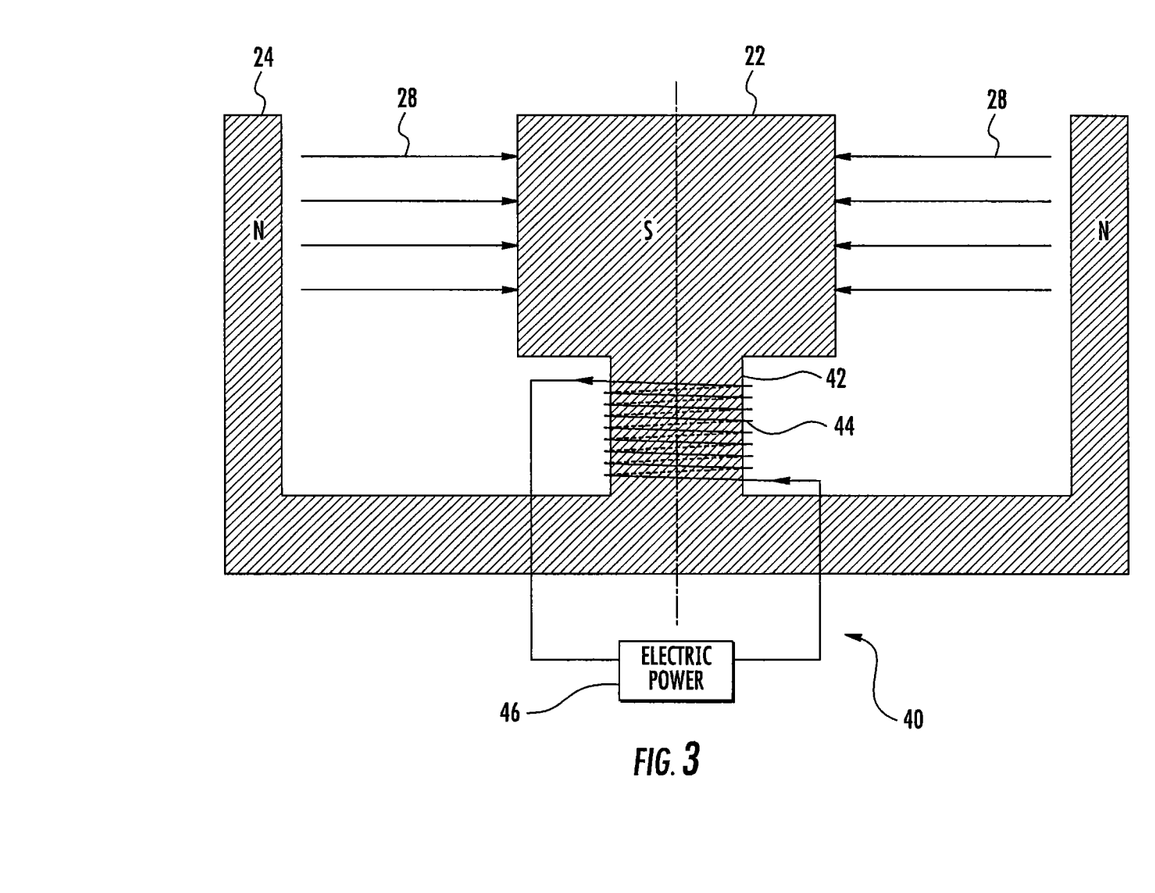
FIG. 3 is a sectional view of the vibrator assembly of FIG. 1 according to some embodiments.

An example coil assembly 40 is illustrated in FIGS. 2 and 3. At least one arm or bar 42 may extend between the center electromagnet 22 and the outer electromagnet 24. A coil 44 may be disposed around each bar 42.

A power source 46 provides current through the coils 44 such that center and outer electromagnets 22, 24 have opposite magnetic polarities. For example, as illustrated in FIG. 2, the power source 46 supplies current in a first direction such that the center electromagnet 22 has a magnetic north polarity and the outer electromagnet 24 has a magnetic south polarity.

The power source 46 may then provide current in a second, opposite direction such that the polarities of the center and outer electromagnetic 22, 24 are reversed. For example, as illustrated in FIG. 3, the power source 46 supplies current in a second, opposite direction such that the center electromagnet 22 has a magnetic south polarity and the outer electromagnet 24 has a magnetic north polarity.

The direction of the current may be reversed repeatedly (e.g., continuously) to provide the oscillating magnetic field 28. As described above, the rotor 20 rotates about its longitudinal axis 32 in response to the oscillating magnetic field 28 (FIG. 1).

According to some embodiments, the power source 46 is disposed outside the housing 12 (or outside the outer electromagnet 24). According to some other embodiments, the power source 46 is disposed inside the housing 12 (or inside the outer electromagnet 24). The power source 46 may be a battery that is held in a housing of an electronic device in which the vibrator assembly 10 is disposed.

Figure 4:
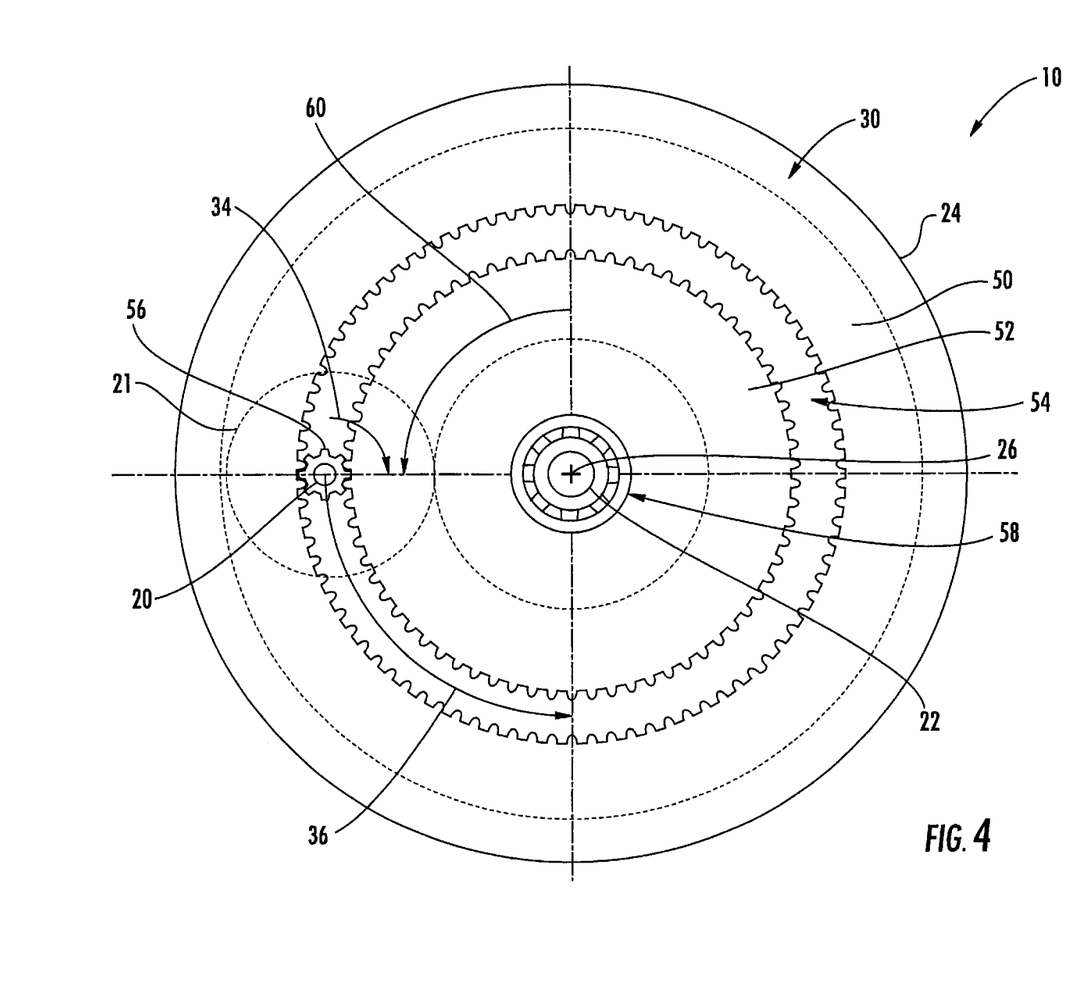
FIG. 4 is an axial or end view of the vibrator assembly of FIG. 1 further illustrating a suspension system according to some embodiments.
Figure 5:
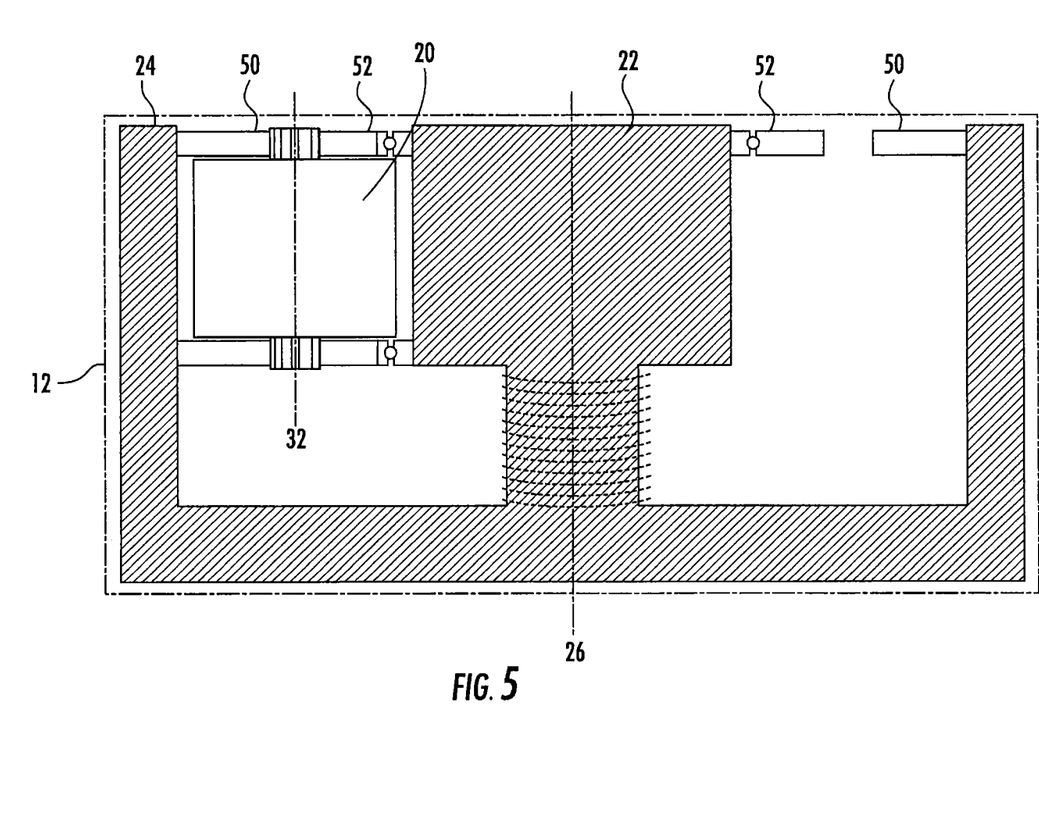
FIG. 5 is a sectional view of the vibrator assembly of FIG. 4 according to some embodiments.

An example suspension system 30 is illustrated in FIGS. 4 and 5. The suspension system 30 includes an outer gear or cogwheel 50 and an inner gear or cogwheel 52. The outer gear 50 is fixed (e.g., the outer gear 50 may be fixedly coupled to the housing 12 or to the outer electromagnet 24). The inner gear 52 is rotatable (e.g., the inner gear 52 may be rotatably coupled to the inner electromagnet 22 or to a bearing 58 disposed around the inner electromagnet 22). A gap 54 is defined between the outer gear 50 and the inner gear 52.

A rotor gear or cogwheel 56 is provided around the rotor 20 or a portion of the rotor 20. For example, the rotor gear 56 may engage with an end portion of the rotor 20 that has a smaller diameter than the central portion of the rotor (e.g., the central portion of the rotor may have a larger diameter as indicated by the dashed circle 21 in FIG. 4 and as also illustrated in FIG. 5).

Teeth of the rotor gear 56 engage teeth of the outer gear 50 and/or the inner gear 52. As described above, the oscillating magnetic field causes the rotor 20 to rotate about its center of mass as indicated by the arrow 34. This rotation causes the inner gear 52 to rotate as indicated by the arrow 60, which in turn causes the rotor 20 to translate in the gap 54. In other words, the center of mass of the rotor 20 rotates around the central axis 26 in a circular pattern as indicated by the arrow 36.

The bearing 58 stabilizes the inner gear 52. According to some embodiments, the bearing 58 is a ball bearing.

It will be understood that the suspension system 30 as illustrated in FIGS. 4 and 5 is an example suspension system and that one of ordinary skill in the art would understand that other suspension systems could be employed to provide the rotation of the rotor 20 around the central axis 26. For example, the suspension system 30 may be or include a belt, a rail, a track, or another suspension member or system known to those of ordinary skill in the art.

Figure 6:
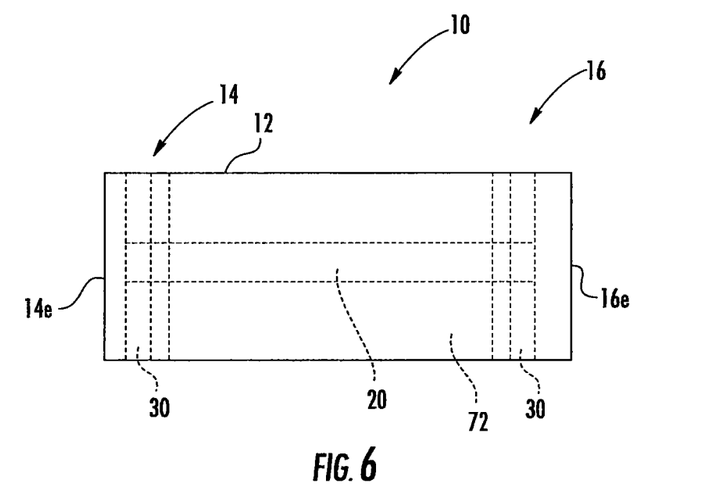
FIG. 6 is a side view of a vibrator assembly according to some other embodiments.

A side view of the vibrator assembly 10 according to some other embodiments is illustrated in FIG. 6. The housing 12 includes first and second opposite end portions 14, 16. The vibrator assembly 10 includes a plurality of electromagnets 72 (which may also be referred to herein as pole pieces). The rotor 20 and the electromagnets 72 may be held in the housing 12. Alternatively, the housing 12 may be omitted and the electromagnets 72 may form the casing, enclosure or housing of the vibrator assembly 100.

Figure 7:
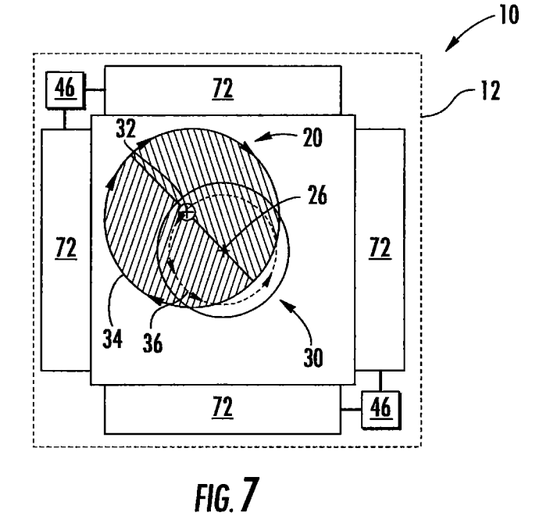
FIG. 7 is a sectional view of the vibrator assembly of FIG. 6 according to some embodiments.

FIG. 7 is a sectional view of the vibrator assembly 10 of FIG. 6 according to some embodiments. Each electromagnet 72 is in electrical communication with a power source 46, which may be inside or outside the housing 12 as described above. The power source 46 is configured to supply electric current to the electromagnet 72 to energize (e.g., turn on) the electromagnet 72 and/or to change the magnetic polarity of the electromagnet 72. Coils similar to the coil 44 illustrated in FIGS. 2 and 3 may be used to energize and/or to change the magnetic polarity of the electromagnets 72 (e.g., a coil may be wound around each electromagnet 72).

According to some embodiments, the power source(s) 46 sequentially energize or change the polarity of the electromagnets in a clockwise or counterclockwise direction. By way of example, the power source(s) 46 may first energize the upper electromagnet 72 in FIG. 7, then energize the left electromagnet 72, then energize the lower electromagnet 72, and then energize the right electromagnet 72, with the sequence then repeated (e.g., continuously or until the vibration is to cease). By way of further example, the power source(s) 46 may supply current to the electromagnets 72 such that the upper electromagnet 72 first has a north magnetic polarity and the lower electromagnet 72 has a south magnetic polarity, then the left electromagnet 72 has a north magnetic polarity and the right electromagnet 72 has a south magnetic polarity, then the lower electromagnet 72 has a north magnetic polarity and the upper electromagnet 72 has a south magnetic polarity, then the right electromagnet 72 has a north magnetic polarity and the left electromagnet 72 has a south magnetic polarity, with the sequence then repeated (e.g., continuously or until the vibration is to cease).

As a result, the rotor 20 rotates about its longitudinal axis 32 as illustrated by the arrow 34. In response, the rotor 20 (or the center of mass thereof) translates along the suspension system 30.

The suspension system 30 may be the same or similar to the suspension system 30 described above. For example, the suspension system 30 may be at one or both of the opposite end portions 14, 16 of the housing 12. The outer gear(s) or cogwheel(s) may be fixed to the housing 12 and the inner gear(s) or cogwheel(s) may be rotatably coupled to one or both ends 14e, 16e of the housing 12.

Therefore, the rotor 20 also rotates about the central axis 26 that is defined by the housing 12 or the electromagnets 72. This rotation of the rotor 20 about the central axis 26 causes the vibrator assembly 10 to vibrate.

The vibrator assembly 10 as illustrated in FIG. 7 generates a magnetic field using two counter-mounted electromagnets 72 at a time. This is an example of a four-phase system. Although four electromagnets 72 are illustrated in FIG. 7, is contemplated that two or more electromagnets may be employed in various embodiments.

Figure 8:
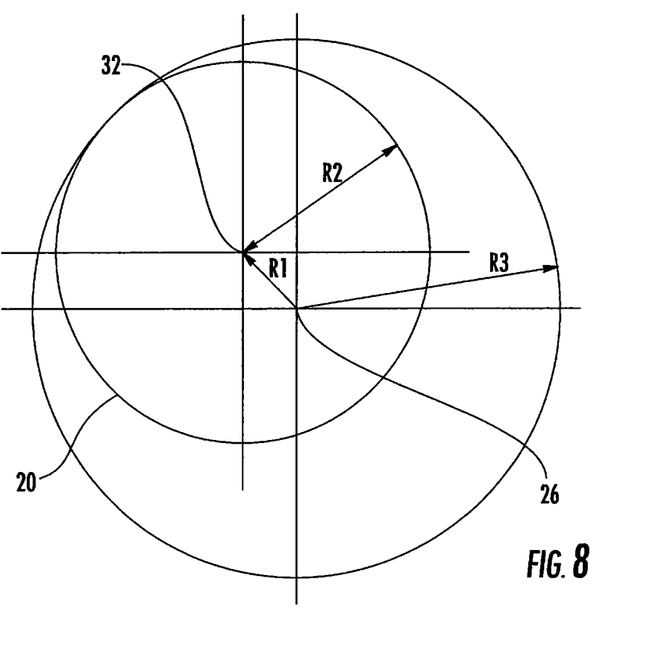
FIG. 8 schematically illustrates a rotor of the vibrator assembly of FIGS. 1 and 7 as resembling a planetary gear.

In the embodiments illustrated in FIGS. 1 and 7, the vibration assembly 10 resembles a planetary gear system (or epicyclic gear system) with the rotor 20 resembling one of the planetary wheels. Referring to FIG. 8, R1 is the radius from the central axis 26 to the center of mass or the rotational axis 32 of the rotor 20, R2 is the radius of the rotor 20 and R3 is the maximum radius of rotation of the rotor 20 about the central axis 26. According to some embodiments, the optimum radius relationship that provides the maximum vibration force is R2=2/3×R3.

Conventional vibrators used in electronic devices include a motor with a deliberately unbalanced mass on the rotor axis. The vibrator vibrates due to the reaction force of the unbalanced mass as the rotor rotates.

It is desirable for the vibration to be between about 100 and 150 Hz because this is the frequency range where human skin is most sensitive. The motors used in conventional vibrators must be relatively large to provide vibration in this frequency range. Any reduction in size (e.g., to the rotor and/or the unbalanced mass) would require the motor to rotate at speeds that are too high to produce vibration in this optimal frequency range.

The vibrator assemblies as described herein address this issue by separating the rotor rotational frequency from the vibration frequency. As described above, the vibration frequency is created by the rotation of the rotor center of mass about the central axis of the vibrator assembly. This vibration frequency is independent of the frequency or speed at which the rotor rotates about its longitudinal axis.

This allows the rotor to rotate at much higher speeds than do motors used in conventional vibrators for electronic devices. Particularly for smaller motors, this increased rotational speed results in the motor operating with considerably higher efficiency.

The increased efficiency allows for considerably smaller motors (rotors) to be used in the vibrator assemblies as described herein. That is, a smaller motor with higher efficiency can provide the same power as a larger motor with lower efficiency. The smaller motor or rotor advantageously reduces the size of the vibration assembly.

Figure 9:
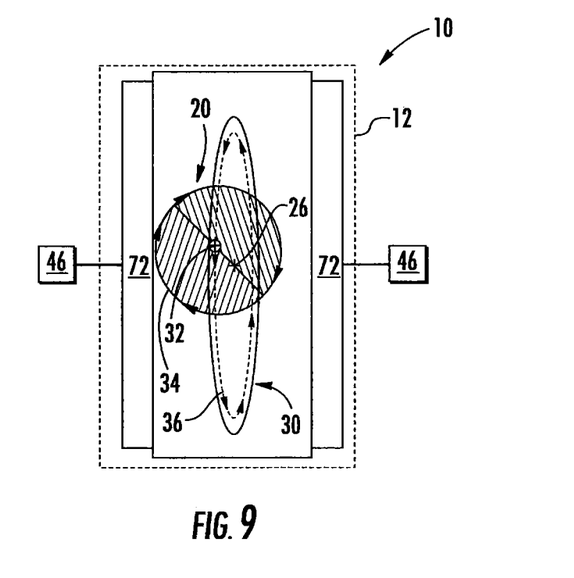
FIG. 9 is a sectional view of the vibrator assembly of FIG. 6 according to some other embodiments.

A sectional view of the vibrator assembly 10 of FIG. 6 according to some other embodiments is illustrated in FIG. 9. Here, the vibrator assembly 10 includes first and second electromagnets 72. At least one power source 46 is electrically connected to each of the electromagnets 72 (or to a coil disposed on the electromagnet 72). The power source 46 supplies current to turn on the electromagnet 72 and/or to change the magnetic polarity of the electromagnet 102. The power source(s) and the coil(s) may be the same or similar to those described above.

The power source(s) 46 may sequentially turn on the first electromagnet 72 and thereafter turn on the second electromagnet 72. Additionally or alternatively, the power source(s) 46 and the electromagnets 72 may be configured to cycle the magnetic polarity of each electromagnet 72. For example, the first electromagnet 72 may first have north magnetic polarity and the second electromagnet 72 may have south magnetic polarity and then the first electromagnet 72 may have south magnetic polarity and the second electromagnet 72 may have north magnetic polarity (with the cycle repeating to create an oscillating magnetic field).

The oscillating magnetic field causes the rotor 20 to rotate about the longitudinal axis 32 of the rotor 20. In the same or similar manner as described above, the rotor 20 translates along the suspension system 30 and therefore rotates about the central longitudinal axis 26 defined by the housing 12 and/or the electromagnets 72. The vibrator assembly 10 vibrates as a result of this translation and rotation about the central axis 26.

The suspension system 30 is configured such that the rotor 20 rotates about the central axis 26 in an elliptical pattern instead of a circular pattern. The suspension 30 may be similar to the suspension system 30 described above in reference to FIG. 7 (e.g., the suspension system 30 in the vibration unit 10 of FIG. 9 may include elliptical gears to provide the elliptical path along which the rotor translates).

The vibrator assemblies 10 described herein may vibrate due to the centrifugal acceleration force ($a=v^2/r$; where a is acceleration, v is velocity of the rotor 20 translating along the suspension system 30, and r is the radius of rotation about the central axis 26).

Figure 10:
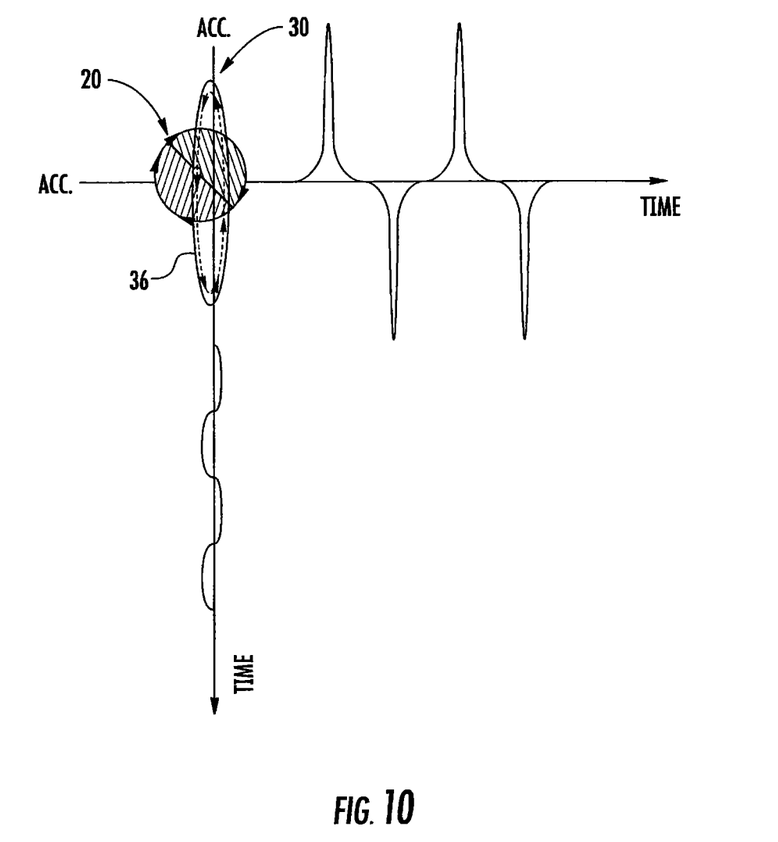
FIG. 10 is a graph illustrating the acceleration of a rotor of the vibrator assembly of FIG. 9 over time.

FIG. 10 is a graph illustrating acceleration force over time for the vibrator assembly of FIG. 9. The centrifugal acceleration force is low over the ellipse except at the areas around the major axis vertices where the curvature of the trajectory is higher. It can be seen that the acceleration forces are concentrated in one dimension and also concentrated in time.

Conventional vibrators have a constant rotational radius for the eccentric mass and therefore distribute vibrational forces equally in a two-dimensional plane (e.g., in a sinusoidal pattern). In contrast, the vibrator assembly illustrated in FIG. 9 concentrates energy in one dimension and in short time intervals which provides higher peak values for acceleration forces.

It is contemplated that the higher peak values for acceleration forces may increase the perceived vibration on the user's skin. In particular, energy is maintained in one dimension and not wasted in two dimensions; as a result, the displacement of the vibrated device and the perceived vibration may increase. Therefore, for a given requirement of perceived vibration, the size of the vibrator assembly of FIG. 9 may be further reduced.

The reduced size of the vibrator assemblies as described herein facilitates the miniaturization that is desirable for portable electronic devices such as smart phones, tablet computers, and wearable accessories such as smart watches.

Figure 11:
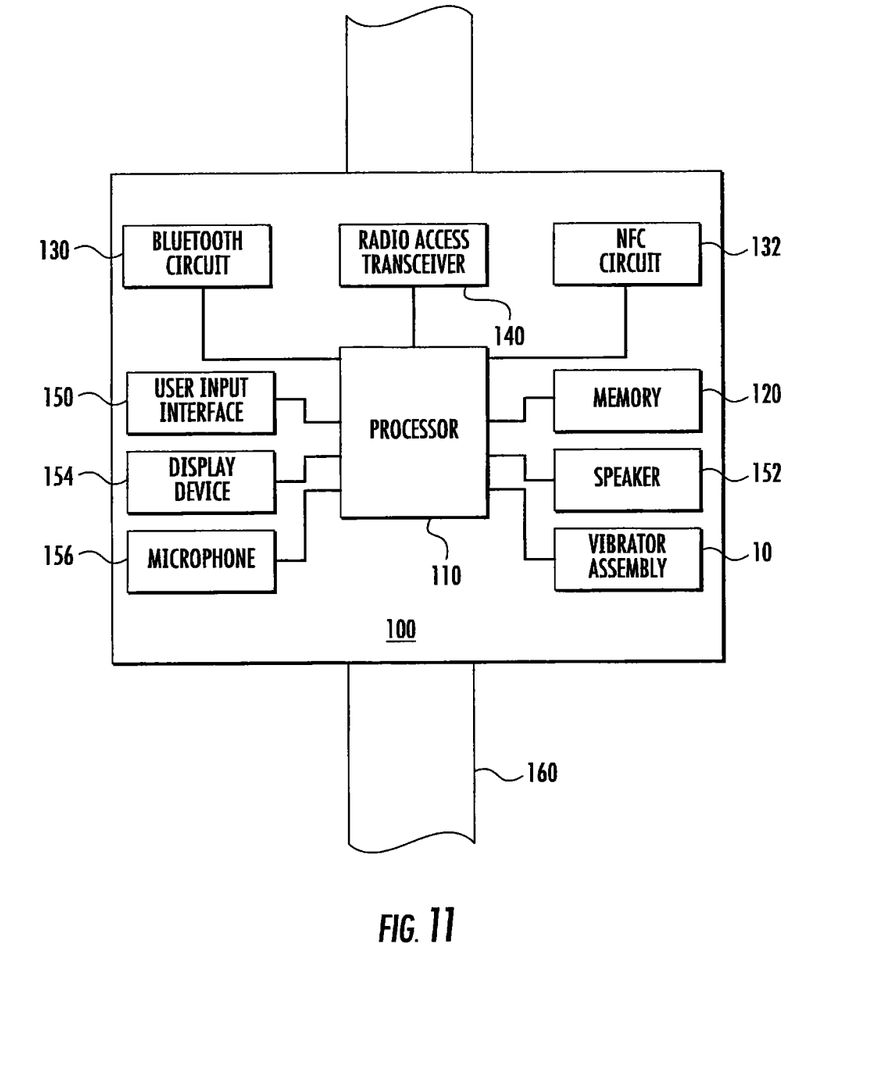
FIG. 11 is a block diagram of an electronic device incorporating the vibrator assembly of FIG. 1, 7 or 9 according to some embodiments.

FIG. 11 illustrates an example electronic device 100. The electronic device 100 includes a housing 102. The electronic device 300 also includes a processor 110. The processor 110 may include one or more data processing circuits, such as a general purpose and/or special purpose processor, such as a microprocessor and/or digital signal processor. The processor 110 is configured to execute computer program code in the memory 120, which may be a non-transitory computer readable medium, to perform at least some of the operations and methods described herein as being performed by an electronic device. The electronic device 100 may further include a Bluetooth circuit 130 configured to communicate with other Bluetooth devices, an NFC circuit 132 configured to communicate with NFC-enabled devices or tags, speaker 152, user input interface 150, a display device 154, and a microphone 156. The electronic device 100 may furthermore include a radio access transceiver 140 that can include, but is not limited to, a LTE or other cellular transceiver, WLAN transceiver (IEEE 802.11), WiMax transceiver, or other communication transceiver configured to communicate with a network node of a communications system.

The electronic 100 incorporates the vibrator assembly 10 according to embodiments described herein to, for example, reduce the size of the electronic device. According to some embodiments, the electronic device 100 may be a portable electronic device such as a mobile telephone or a tablet computer. According to some embodiments, the electronic device 100 may be wearable accessory or device. For example, the electronic device 100 may be a smart watch that includes a strap 160 that allows the watch to be worn around the wrist of a user.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

The invention claimed is:

1. A vibrator assembly comprising:
a housing defining a longitudinal central axis;
a rotor in the housing and spaced apart from the central axis, the rotor defining a longitudinal rotational axis that is parallel to the central axis;
an outer electromagnet between the housing and the rotor; and
a center electromagnet having a longitudinal axis that is coaxial with the central axis,
wherein the rotor is configured to rotate about the rotational axis and, in response, to rotate about the central axis, and
wherein the outer electromagnet and the center electromagnet are configured to generate an oscillating magnetic field therebetween to rotate the rotor about the rotational axis.

2. The vibrator assembly of claim 1 wherein the vibrator assembly is configured to vibrate in response to the rotation of the rotor about the central axis.

3. The vibrator assembly of claim 1 wherein the outer and center electromagnets are configured to receive electric current from at least one power source to sequentially change the magnetic polarity of the outer and center electromagnets to generate the oscillating magnetic field.

4. The vibrator assembly of claim 1 further comprising a suspension system in the housing, wherein the rotor is configured to translate along the suspension system to rotate about the central axis.

5. The vibrator assembly of claim 4 wherein the suspension system comprises an outer gear and an inner gear with a gap defined between the outer gear and the inner gear, and wherein the rotor is configured to translate in the gap to rotate about the central axis.

6. The vibrator assembly of claim 5 further comprising a rotor gear on the rotor, wherein:
the outer gear is fixed relative to the housing;
the inner gear is rotatable relative to the housing;
the rotor gear engages the outer gear and the inner gear;
the inner gear is configured to rotate in response to the rotation of the rotor about the rotational axis; and
the rotor is configured to translate in the gap in response to the rotation of the inner gear.

7. The vibrator assembly of claim 5 wherein the inner gear surrounds the center electromagnet.

8. The vibrator assembly of claim 1 wherein the rotor is configured to rotate about the central axis in a circular pattern.

9. The vibrator assembly of claim 1 wherein the rotor is configured to rotate about the central axis in an elliptical pattern.

10. The vibrator assembly of claim 1 wherein the rotor comprises a permanent magnet.

11. A vibrator assembly comprising:
at least one electromagnet defining an enclosure, the enclosure defining a longitudinal central axis at a center of the enclosure; and
at least one elongated rotor in the enclosure and spaced apart from the central axis, the rotor defining a longitudinal rotational axis that extends through the center of mass of the rotor,
wherein the at least one electromagnet is configured to generate a magnetic field, the rotor is configured to rotate about the rotational axis in response to the generated magnetic field, and the rotor is configured to rotate about the central axis in response to the rotation of the rotor about the rotational axis,
wherein the at least one electromagnet comprises first and second electromagnets that face one another, and wherein the first and second electromagnets are configured to sequentially turn on and/or change magnetic polarity to generate the magnetic field, and
wherein the rotor is configured to rotate about the central axis in an elliptical pattern.

12. The vibrator assembly of claim 11, wherein the at least one electromagnet comprises third and fourth electromagnets, the first and third electromagnets facing one another in a first direction that is perpendicular to the central axis and the second and fourth electromagnets facing one another in a second direction that is perpendicular to each of the central axis and the first direction, and wherein the first, second, third and fourth electromagnets are configured to sequentially turn on and/or change magnetic polarity to generate the magnetic field.

13. The vibrator assembly of claim 11 further comprising a suspension system holding the rotor, wherein the rotor is configured to translate along the suspension system to rotate about the central axis.

14. The vibrator assembly of claim 11 wherein the rotor comprises a permanent magnet.

15. An electronic device comprising:
    an electronic device housing; and
    a vibrator assembly in the housing, the vibrator assembly comprising:
        a vibrator assembly housing defining a longitudinal central axis;
        a rotor in the vibrator assembly housing and spaced apart from the central axis, the rotor defining a longitudinal rotational axis that is parallel to the central axis; and
        an outer electromagnet between the vibrator assembly housing and the rotor and surrounding the rotor,
    wherein the rotor is configured to rotate about the rotational axis and, in response, to rotate about the central axis,
    wherein the vibrator assembly is configured to vibrate the electronic device housing in response to the rotation of the rotor about the central axis, and
    wherein the rotor comprises a permanent magnet.

16. The electronic device of claim 15 wherein the electronic device is one of a mobile telephone, a smart watch and a smart bracelet.

17. The electronic device of claim 15 wherein the rotor is configured to rotate about the central axis in an elliptical pattern.

18. The electronic device of claim 15 wherein the vibrator assembly further comprises a center electromagnet having a longitudinal axis that is coaxial with the central axis, the outer electromagnet and the center electromagnet configured to generate an oscillating magnetic field therebetween to rotate the rotor about the rotational axis.

* * * * *